United States Patent
Dawson et al.

(10) Patent No.: US 8,438,130 B2
(45) Date of Patent: May 7, 2013

(54) METHOD AND SYSTEM FOR REPLICATING DATA

(75) Inventors: Colin S. Dawson, Tucson, AZ (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/966,649

(22) Filed: Dec. 13, 2010

(65) Prior Publication Data

US 2012/0150798 A1 Jun. 14, 2012

(51) Int. Cl.
G06F 7/00 (2006.01)
G06F 17/00 (2006.01)

(52) U.S. Cl.
USPC ............................ 707/610; 707/613; 707/637

(58) Field of Classification Search ........................ None
See application file for complete search history.

(56) References Cited

U.S. PATENT DOCUMENTS

| | | |
|---|---|---|
| 7,584,338 B1 | 9/2009 | Bricker et al. |
| 2005/0071391 A1* | 3/2005 | Fuerderer et al. ............. 707/204 |
| 2005/0086272 A1 | 4/2005 | Novik et al. |
| 2008/0263109 A1 | 10/2008 | Patterson |
| 2011/0040728 A1 | 2/2011 | Akirav et al. |
| 2011/0072291 A1* | 3/2011 | Murase ......................... 713/324 |
| 2011/0252070 A1* | 10/2011 | Khosrowpour et al. ....... 707/802 |

* cited by examiner

*Primary Examiner* — Pierre Vital
*Assistant Examiner* — Berhanu Mitiku
(74) *Attorney, Agent, or Firm* — Griffiths & Seaton PLLC

(57) ABSTRACT

Methods, computer systems, and computer program products for replicating data are provided. Meta-data and data associated with the meta-data are received at a first data server. A new portion of the data that is not already stored on the first data server is identified. The new portion of the data is stored on a second data server before the meta-data is stored on the second data server.

17 Claims, 3 Drawing Sheets

METHOD AND SYSTEM FOR REPLICATING DATA

BACKGROUND OF THE INVENTION

1. Field of the Invention

The present invention relates in general to computers, and more particularly to methods, computer systems, and computer program products for replicating data, especially in a deduplication system.

2. Description of the Related Art

Replication models usually provide either synchronous or asynchronous with regards to how and when replication is performed. In the synchronous model, data is replicated to the target as soon as possible after the data is stored to the source. Some models may do this as part of transaction processing such that the data is not considered successful until it is written to both sites while others may choose to allow transaction/operation completion at the source with the replication happening immediately after that. In either case, this is synchronous or near-synchronous in terms of what is provided and the expectations being achieved for the end-user. On the other hand, asynchronous allows for some mechanism to schedule replication. In this case, the scheduled replication is expected to be within some sort of timely manner to meet recovery point objectives while balancing those with bandwidth/capacity available for the replication.

In some storage management systems, server to server replication is provided as an asynchronous replication capability that is scheduled and managed through administrative oversight. While there are many benefits to replication, this may still represent a bandwidth and capacity issue when replication is performed. As an example, if the replication needs to process hundreds of thousands or millions of files within a defined replication window, considerable system and network resources may be required.

SUMMARY OF THE DESCRIBED EMBODIMENTS

In one embodiment, a method for replicating data is provided. Meta-data and data associated with the meta-data are received at a first data server. A new portion of the data that is not already stored on the first data server is identified. The new portion of the data is stored on a second data server before the meta-data is stored on the second data server.

In another embodiment, a computer system is provided. The computer system includes at least one computer-readable medium and at least one processor in operable communication with the at least one computer-readable medium. The at least one processor is adapted to receive meta-data and data associated with the meta-data at a first data server, identify a new portion of the data that is not already stored on the first data server, and store the new portion of the data on a second data server before the meta-data is stored on the second data server.

In a further embodiment, a computer program product for replicating data in a computing environment is provided. The computing environment includes at least one computer-readable medium having computer-readable program code portions stored thereon. The computer-readable program code portions include a first executable portion, a second executable portion, and a third executable portion. The first executable portion is for receiving meta-data and data associated with the meta-data at a first data server. The second executable portion is for identifying a new portion of the data that is not already stored on the first data server. The third executable portion is for storing the new portion of the data on a second data server before the meta-data is stored on the second data server.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and computer program products for deleting deduplicated data in a computer environment, such as a computer system.

Replication encompasses two primary tasks in such a server to server replication environment. One of the tasks is meta-data reconciliation. Meta-data refers to the attributes of the data, which are stored in support of the data, such as the name of the file, who it belongs to, when it was stored, and other meaningful attributes used by the system. The other primary task is the movement of data as either data transmission itself for necessary chunks or else the data reference transmission to relate an object to an existing chunk on the target server. Given the multiple types of data to be handled and the volume (i.e., large numbers of objects and data chunks) that may need to be handled in a large environment, optimization is needed to expedite the replication operation while balancing the resource requirements applied to a given replication operation.

According to one embodiment, a hybrid replication model is proposed in which new and unique data chunks (or portions or extents) of deduplicated data are sent to the target server in a near synchronous manner as they come into the originating server and are identified. The flow of data in this asynchronous model may be constrained by policies that govern how much bandwidth may be used by the operation. This may augment asynchronous replication by bootstrapping needed data chunks as already being available at the target server so that the replication operation primarily focuses on the meta-data reconciliation, as less data needs to be transferred because it is already stored on the target server. Essentially, the chunk of data is stored as a deduplication data chunk without a corresponding reference to a dependent file (i.e., meta-data) on the target server. A future asynchronous replication operation from the source server is then used to establish the meta-data that references these chunks and causes the reference values for the chunks to go from being unused (zero references) to used by however many objects rely on it.

As such, in one embodiment, a method for replicating data is provided. Meta-data and data associated with the meta-data are received at a first data server. A new portion of the data that is not already stored on the first data server is identified. The new portion of the data is stored on a second data server before the meta-data is stored on the second data server.

Figure 1:
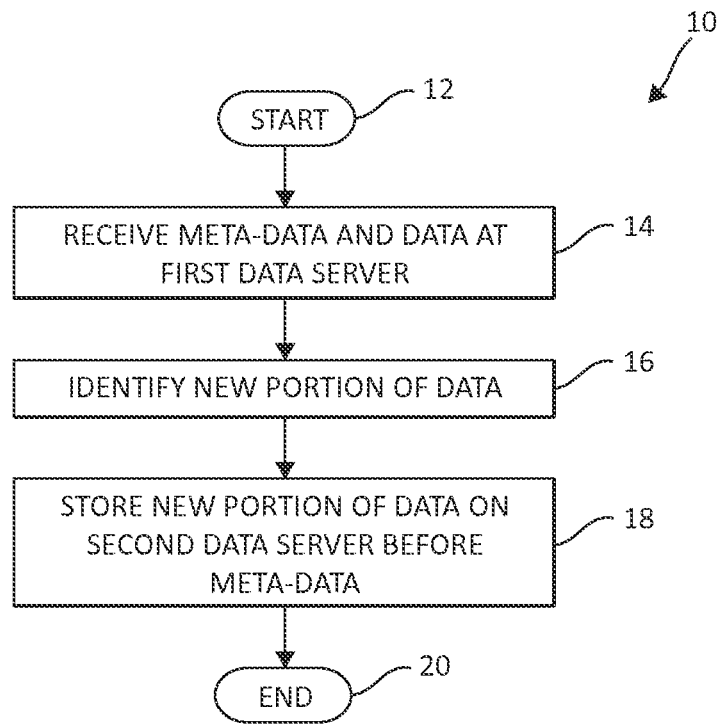
FIG. 1 is a flow chart of a method for replicating data in a computer environment according to an embodiment of the present invention.

FIG. 1 illustrates a method 10 for replicating data according to one embodiment of the present invention. The method 10 begins at step 12 with, for example, a file (e.g., meta-data and associated data or object) being sent by (or from) a client to a first data server. At step 14, the meta-data data are received (and/or stored) on the first data server. At step 16, any new portion (or portions) of the data that are new to the first data server (i.e., not already stored on the first data server) are identified. Because of the replication relationship between the source and target servers, data that is new and unique to the source server is a candidate to be sent to the target as well. As is commonly understood, such a procedure may be included in a deduplication process, an example of which is described below. Then, at step 18, the new portion of the data is stored on a second data server (e.g., a remote server, such as in another city) before the meta-data is stored on (and/or sent to) the second data server.

It should be understood that the target server may be the target for replication from many different source servers. As such, the data portion in question (i.e., new and unique previously unseen on the source server) may already exist on the target server because it was populated from a different source server. The method/system described herein may allow for the fact that a portion that appears new/unique on the source may not actually need to be sent because it is already stored on the target server. In such a case, the decision may be made not to send such a portion of data.

At step 20, the method 10 ends with, for example, the completion of the storing all of the new data from the first data server on the second server. However, it should be understood that, in at least some embodiment, a scheduled asynchronous replication process may interrupt the method 10 before all of the new portions are stored on the second server. For example, if bandwidth is highly constrained, only 20-30% of the new portions may be stored on the second server before the scheduled asynchronous replication begins. However, in such a case, the method described herein may advantageously reduce the work that is then performed during the asynchronous replication.

Figure 2:
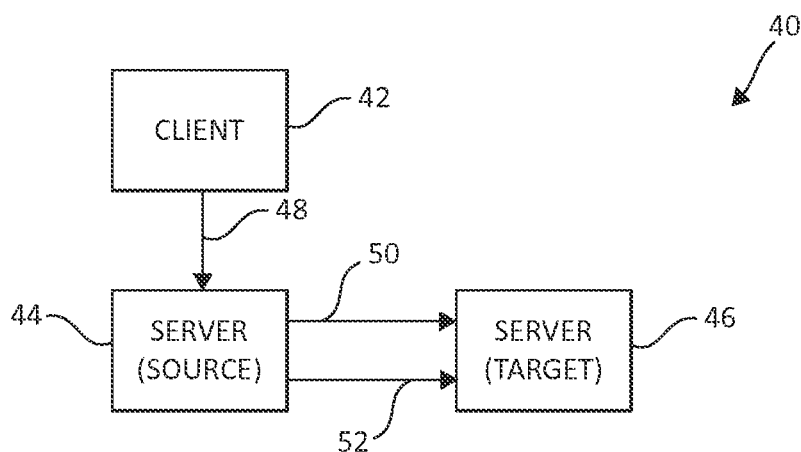
FIG. 2 is a block diagram of a computer network according to an embodiment of the present invention.

FIG. 2 illustrates a computer network 40, according to an embodiment of the present invention. The computer network 40 includes a client 42, a source server (or first data server) 44, and a target server (or second data server) 46. Although not specifically shown in FIG. 2, the client 42, the source server 44, and the target server 46 are in operable communication via a network such as a wide area network (WAN). The client 42 may be a computer system, such as a desktop or laptop personal computer (PC). The source server 44 and the target server 46 may be, for example, data storage servers, as is commonly understood.

As suggested above, embodiments of the present invention may be initiated with the client 42 sending a packet 48 to the source server 44. The packet 48 includes, in one embodiment, meta-data and data (or an object) associated with the meta-data. Upon receiving (and/or storing) the meta-data and data, the source server 44 performs a deduplication process, as is commonly understood, to ensure that none of the data is already stored thereon. In one embodiment, the deduplication process includes dividing the data into a plurality of portions (or chunks or extents), calculating a hash value for each of the portions, and comparing the calculated hash values to hash values for data that is already stored on the source server (i.e., "old" data).

If any portions of the data sent from the client (i.e., in the packet 48) have hash values that do not match any of the hash values of the data already stored on the source server 44, those portions may be assumed to be new or unique (i.e., not already stored on the source server). In one embodiment, new portions 50 of data are automatically sent to and stored on the target server 46 (after being identified as being new/unique to the source server 44).

Of particular interest is that the new portions 50 of the data are sent to and stored on the target server 46 before the associated meta-data is sent to or stored on the target server 46. In other words, the new data portions are sent to the target server 46 before any sort of replication (or back-up) process between the source server 44 and target server 46 has been initiated. As indicated in FIG. 2, the meta-data 52 is sent to the target server 46, but only after a replication process (i.e., an asynchronous replication process) is initiated. If the replication process is initiated before all of the new portions of data are stored on the target server 46, the remaining new portions are sent to the target server 46 after the replication process begins, as referred to above. (i.e., in accordance with conventional replication processes and the synchronization between that source and target that is performed).

Thus, the method described herein implements a "chunk trickling" sort of data transfer in which as new/unique chunks are identified, they are sent from the source server 44 to the target server 46. This trickle send of the new/unique chunks optimizes the actual future replication operation by only having to transfer the corresponding meta-data and any remaining unsent data chunks and leveraging the fact that many of the needed data chunks have already been seeded to the target server prior to the actually replication operation.

This approach utilizes the source server database and the fact that as data is deduplicated, the data that is new to the system that has a single meta-data (file) reference to a given chunk is new and unique and a candidate to be sent to the target server. For those data chunks that result in a reference to a data chunk that has more then a single meta-data (file) reference or those that refer to a data chunk that was stored prior to the time of last replication, these are not new and unique chunks and would not be candidates for the immediate trickle send. It should be noted that in some embodiments, the storage management system also has a client deduplication capability where the client will only send unique chunks to the server (i.e., those chunks that the server does not already have). This may be another mechanism by which the server may determine the candidate chunks that need to be sent to the target server.

Another advantage to the near immediate replication of new chunks is that it provides data redundancy. In the event that a chunk on the source server is found to be damaged (e.g., device failure prior to a storage pool backup having been performed), the chunk on the target server 46 may be used to recover the damaged chunk by creating a new copy on the source server 44 from the chunk on the target server. That is, if a new chunk of data stored on the first data server is recognized as being damaged, the corresponding chunk, now stored on the target server 46, is sent to the source server 44. The damaged new chunk of data on the source server 44 is thus replaced with the new portion of data sent from the target server 46.

Figure 3:
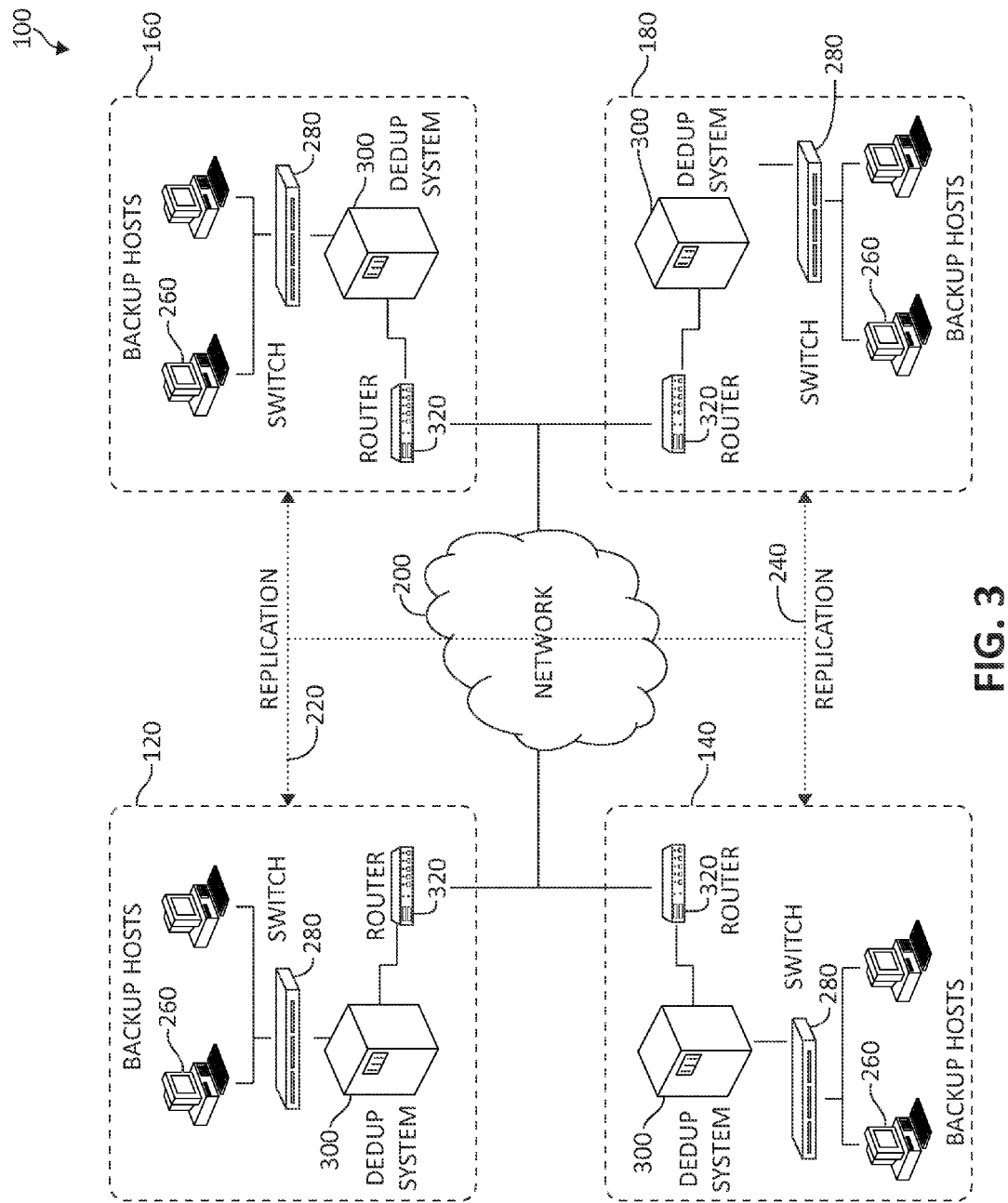
FIG. 3 illustrates an exemplary computing environment in which aspects of the present invention may be implemented.

FIG. 3 illustrates exemplary architecture 100 of deduplication systems (and/or storage management systems) and related components in a computing storage environment. The architecture 100 provides storage services to several backup hosts 260. Deduplicated data replication is provided between various deduplication system groups 120, 140, 160, and 180 as indicated by dashed lines 220 and 240. Each of groups 120, 140, 160, and 180 includes one or more hosts 260, which are connected to a deduplication system 300 via networking components such as a switch 280 as indicated. Deduplication systems 300 are interconnected via networking components such as a router 320, which provides internetwork connectivity between groups 120, 140, 160, and 180. A network 200 connects such deduplication systems 300 and routers 320. The network 200 may, in one embodiment, include a wide area network (WAN). In other embodiments, the network 200 may include local area networks (LANs), storage area networks (SANs), and other network topologies known to the skilled artisan. While routers 320 and switches 280 are shown, the skilled artisan will also appreciate that additional and/or substitute networking components are contemplated.

In one embodiment, the switch 280 is compliant with a fibre channel network protocol, making the switch 280 and interconnected components capable of executing commands such as small computer systems interface (SCSI) commands. Such commands may be executed for a variety of storage devices, again as the skilled artisan will appreciate, such as disk drives, tape devices, solid state devices (SSDs), and the like. While the architecture 100 provides one example of components that may be utilized to implement various facets of the present invention and claimed subject matter, the skilled artisan will appreciate that other such architectures are contemplated.

Figure 4:
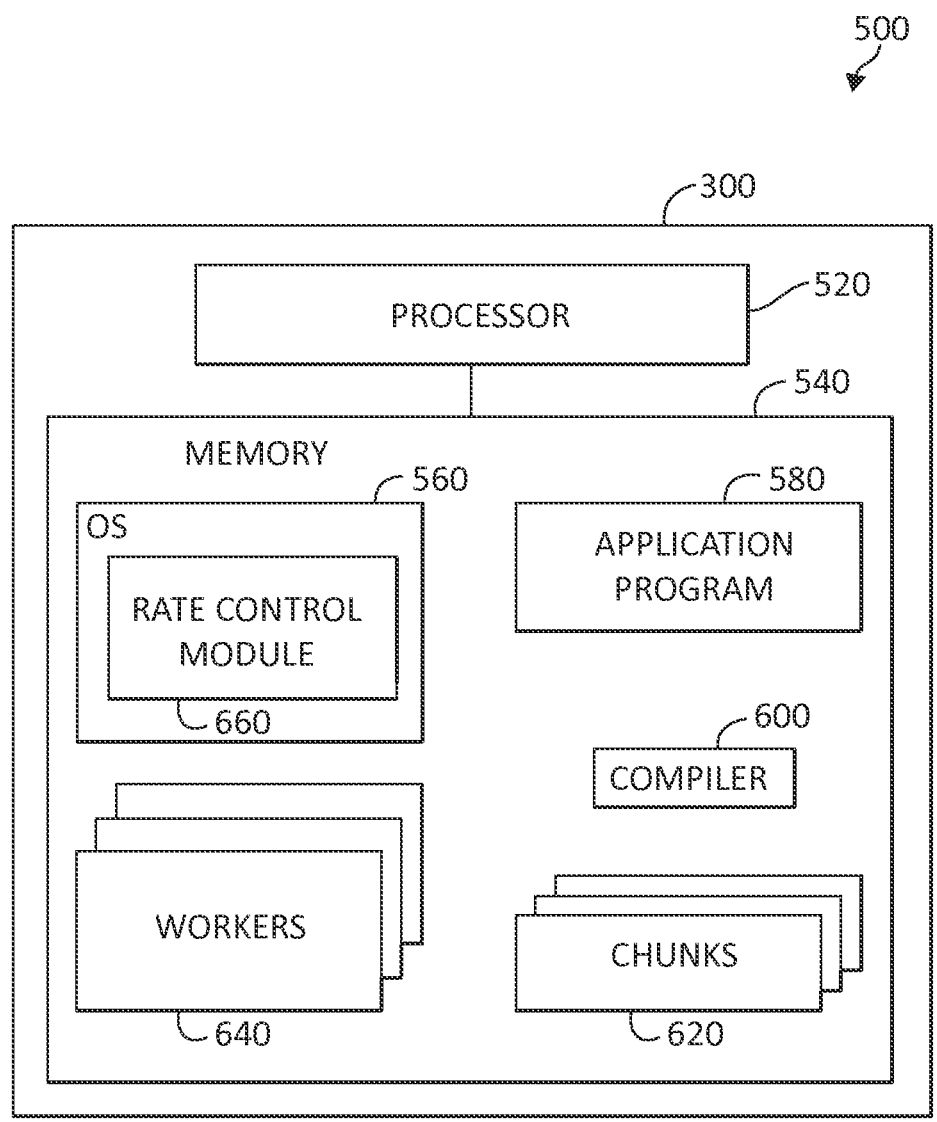
FIG. 4 illustrates an exemplary portion of a deduplication system as illustrated in FIG. 3, previously, including a processor device.

Turning now to FIG. 4, an exemplary portion 500 of a deduplication system 300 as also seen in FIG. 3, previously, is illustrated. The portion 500 of the deduplication system 300 is operable in a computer environment as a portion thereof, in which mechanisms of the above illustrated embodiments may be implemented. It should be appreciated, however, that FIG. 4 is only exemplary and is not intended to state or imply any limitation as to the particular architectures in which the exemplary aspects of the various embodiments may be implemented. Many modifications to the architecture depicted in FIG. 4 may be made without departing from the scope and spirit of the following description and claimed subject matter.

The deduplication system 300 includes a processor 520 and a memory 540, such as random access memory (RAM). The deduplication system 300 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 300.

In the illustrated embodiment, the deduplication system 300 operates under control of an operating system (OS) 560 (e.g. z/OS, OS/2, LINUX, UNIX, WINDOWS, MAC OS) stored in the memory 540, and interfaces with the user to accept inputs and commands and to present results. In one embodiment of the present invention, the OS 560 facilitates rate control mechanisms according to the present invention. To this end, OS 560 includes a rate control module 660 which may be adapted for carrying out various processes and mechanisms in the exemplary methods herein.

The deduplication system 300 may implement a compiler 600 that allows an application program 580 written in a programming language such as COBOL, PL/1, C, C++, JAVA, ADA, BASIC, VISUAL BASIC or any other programming language to be translated into code that is readable by the processor 520. After completion, the computer program 580 accesses and manipulates data stored in the memory 560 of the system 300 using the relationships and logic that was generated using the compiler 600.

To further implement and execute mechanisms and processes according to the present invention, OS 560, in conjunction with the memory 540, the processor 520, the program 580, and other computer processing, networking, and storage components, may implement workers 640 as processing chunks 620 of deduplicated data. As the skilled artisan will appreciate, the mechanisms of the workers 640 and the chunks 620 as presently illustrated may be implemented in various forms and architectures. Accordingly, the illustration of the workers 640 and the chunks 620 in the present figure is again intended to demonstrate logical relationships between possible computing components in the deduplication system 300, and not to imply a specific physical structure or relationship.

In one embodiment, instructions implementing the operating system 560, the computer program 580, and the compiler 600, as well as the workers 640 and chunks 620 are tangibly embodied in a computer-readable medium, which may include one or more fixed or removable data storage devices, such as a zip drive, disk, hard drive, DVD/CD-ROM, digital tape, SSDs, etc. Further, the operating system 560 and the computer program 580 comprise instructions (e.g., in executable portions) which, when read and executed by the system 300, cause the system 300 to perform the steps necessary to implement and/or use the present invention. The computer program 580 and/or the operating system 560 instructions may also be tangibly embodied in the memory 560 and/or transmitted through or accessed by network 200 via various components (e.g., router 320, FIG. 6). As such, the terms "article of manufacture," "program storage device" and "computer program product" as may be used herein are intended to encompass a computer program accessible and/or operable from any computer readable device or media.

Embodiments of the present invention may include one or more associated software application programs 580 that include, for example, functions for managing a distributed computer system comprising a network of computing devices, such as a storage area network (SAN). Accordingly, the processor 520 may comprise one or more storage management processors (SMP). The program 580 may operate within a single computer and/or deduplication system 300 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for replicating data comprising:
   receiving meta-data and data associated with the meta-data at a first data server;
   identifying a new portion of the data that is not already stored on the first data server, the new portion of the data being a new, unique chunk of the data; and
   employing a hybrid replication model by:
      storing the new portion of the data on a second data server without corresponding meta-data in a near synchronous manner and bootstrapping a selected unique chunk of the data as being available at the second data server, while the selected unique chunk of the data has no corresponding meta-data, and
   performing a future asynchronous replication operation from the first data server to establish the corresponding meta-data of the new unique chunk of data as being associated with the new unique chunk of data and to store the corresponding meta-data on the second data server.

2. The method of claim 1, wherein the identifying of the new portion of data comprises:
   dividing the data into a plurality of portions;
   calculating a hash value for each of the plurality of portions; and
   comparing the hash values of the plurality of portions to hash values for portions of data already stored on the first data server.

3. The method of claim 2, further comprising storing the new portion of the data on the first data server.

4. The method of claim 3, further comprising:
   if the new portion of data stored on the first data server is recognized as being damaged, sending the new portion of data stored on the second data server to the first data server; and
   replacing the damaged new portion of data on the first data server with the new portion of data sent from the second data server.

5. The method of claim 1, wherein the new portion of data comprises a plurality of unique chunks of new data and further comprising, if a replication process is initiated before all of the unique chunks of new data are stored on the second data server, storing the remaining unique chunks of new data on the second data server after the corresponding meta-data is stored on the second data server.

6. The method of claim 5, wherein the second data server is remote from the first data server.

7. A computer system comprising:
   at least one computer-readable medium; and
   at least one processor in operable communication with the at least one computer-readable medium, the at least one processor being adapted to:
      receive meta-data and data associated with the meta-data at a first data server;
      identify a new portion of the data that is not already stored on the first data server, the new portion of the data being a new, unique chunk of the data; and
      employ a hybrid replication model by:
         storing the new portion of the data on a second data server without corresponding meta-data in a near synchronous manner and bootstrapping a selected unique chunk of the data as being available at the second data server, while the selected unique chunk of the data does not having corresponding meta-data, and
      performing a future asynchronous replication operation from the first data server to establish the corresponding meta-data of the new unique chunk of data as being associated with the new unique chunk of data and storing the corresponding meta-data on the second data server.

8. The computer system of claim 7, wherein the processor is further configured to, when identifying the new portion of data:
   dividing the data into a plurality of portions;
   calculating a hash value for each of the plurality of portions; and
   comparing the hash values of the plurality of portions to hash values for portions of data already stored on the first data server.

9. The computer system of claim 8, wherein the at least one processor is further adapted to store the new portion of the data on the first data server.

10. The computer system of claim 9, wherein the at least one processor is further adapted to:
    if the new portion of data stored on the first data server is recognized as being damaged, send the new portion of data stored on the second data server to the first data server; and
    replace the damaged new portion of data on the first data server with the new portion of data sent from the second data server.

11. The computer system of claim 7, wherein the new portion of data comprises a plurality of unique chunks of new data and wherein the at least one processor is further adapted to:
    if a replication process is initiated before all of the unique chunks of new data are stored on the second data server, store the remaining unique chunks of new data on the second data server after the corresponding meta-data is stored on the second data server.

12. The computer system of claim 11, wherein the second data server is remote from the first data server.

13. A computer program product for replicating data in a computing environment, the computing environment comprising at least one non-transitory computer-readable medium having computer-readable program code portions stored thereon, the computer-readable program code portions comprising:
    a first executable portion for receiving meta-data and data associated with the meta-data at a first data server;
    a second executable portion for identifying a new portion of the data that is not already stored on the first data server, the new portion of the data being a new, unique chunk of the data; and
    a third executable portion employing a hybrid replication model by:
       storing the new portion of the data on a second data server without corresponding meta-data in a near synchronous manner and bootstrapping a selected unique chunk of the data as being available at the second data server, while the selected unique chunk of the data does not having corresponding meta-data, and performing a future asynchronous replication operation from the first data server to establish the corresponding meta-data of the new unique chunk of data as being associated with the new unique chunk of data and storing the corresponding meta-data on the second data server.

14. The computer program product of claim 13, wherein the identifying of the new portion of data comprises:

dividing the data into a plurality of portions;

calculating a hash value for each of the plurality of portions; and comparing the hash values of the plurality of portions to hash values for portions of data already stored on the first data server.

15. The computer program product of claim 14, further comprising a fourth executable portion for storing the new portion of the data on the first data server.

16. The computer program product of claim 15, further comprising:

a fifth executable portion for sending the new portion of data stored on the second data server to the first data server if the new portion of data stored on the first data server is recognized as being damaged; and a sixth executable portion for replacing the damaged new portion of data on the first data server with the new portion of data sent from the second data server.

17. The computer program product of claim 13, wherein the second data server is remote from the first data server and the new portion of data comprises a plurality of unique chunks of new data, and further comprising:

a sixth executable portion for storing the remaining unique chunks of new data on the second data server after the meta-data is stored on the second data server if a replication process is initiated before all of the unique chunks of new data are stored on the second data server.

* * * * *